United States Patent
Uchida et al.

(10) Patent No.: US 9,751,796 B2
(45) Date of Patent: Sep. 5, 2017

(54) SINTERING APPARATUS AND METHOD FOR SINTERING

(71) Applicant: Shin-Etsu Chemical Co., Ltd., Tokyo (JP)

(72) Inventors: Kazuya Uchida, Ibaraki (JP); Tetsuya Otosaka, Ibaraki (JP)

(73) Assignee: Shin-Etsu Chemical Co., Ltd., Ibaraki (JP)

( * ) Notice: Subject to any disclaimer, the term of this patent is extended or adjusted under 35 U.S.C. 154(b) by 4 days.

(21) Appl. No.: 15/080,467

(22) Filed: Mar. 24, 2016

(65) Prior Publication Data

US 2016/0280583 A1 Sep. 29, 2016

(30) Foreign Application Priority Data

Mar. 24, 2015 (JP) .................................. 2015-060873
Mar. 23, 2016 (JP) .................................. 2016-057846

(51) Int. Cl.
*C03B 37/012* (2006.01)
*C03B 19/06* (2006.01)
*C03B 37/014* (2006.01)

(52) U.S. Cl.
CPC ...... *C03B 37/0146* (2013.01); *C03B 2205/81* (2013.01)

(58) Field of Classification Search
CPC .......................... C03B 37/01282; C03B 19/06
USPC ........................................ 65/17.3, 17.4, 413
See application file for complete search history.

(56) References Cited

U.S. PATENT DOCUMENTS

| 4,419,118 A | * | 12/1983 | Reiji | ...................... C03B 19/01 65/17.4 |
| 4,514,205 A | * | 4/1985 | Darcangelo | ....... C03B 37/02718 65/158 |
| 5,259,856 A | * | 11/1993 | Ohga | ................ C03B 37/01446 65/423 |
| 5,279,633 A | * | 1/1994 | Fleming | .................. C03B 19/01 65/17.2 |
| 6,543,257 B1 | * | 4/2003 | Koaizawa | ......... C03B 37/01486 65/489 |
| 6,763,682 B1 | * | 7/2004 | Sayce | ..................... C03B 17/04 65/126 |
| 2001/0018835 A1 | * | 9/2001 | Abe | .................... C03B 19/1453 65/17.4 |

(Continued)

FOREIGN PATENT DOCUMENTS

JP 2002-226218 A 8/2002

*Primary Examiner* — Nahida Sultana

(57) ABSTRACT

A sintering apparatus for sintering a porous glass base material, including a furnace core tube surrounded by heaters, the furnace core tube housing the porous glass base material; a lid member having an insertion hole through which a holding rod coupled with the porous glass base material is inserted, the lid member mounted at one end of the furnace core tube; a sealing chamber having a supply port that introduces seal gas and a discharging port that discharges the seal gas, the sealing chamber provided at the lid member covering the insertion hole; and a cylindrical member that causes a pressure difference between gas inside of the tube of an inside the furnace core tube and gas inside of the sealing chamber to be generated while the holding rod is inserted through the cylindrical member inside of the sealing chamber.

9 Claims, 3 Drawing Sheets

(56) References Cited

U.S. PATENT DOCUMENTS

| | | | | |
|---|---|---|---|---|
| 2003/0226376 | A1* | 12/2003 | Winnen | C03B 19/095 65/17.4 |
| 2004/0182114 | A1* | 9/2004 | Ooishi | C03B 37/01413 65/413 |
| 2004/0250573 | A1* | 12/2004 | Hack | C03C 3/06 65/17.4 |
| 2005/0257571 | A1* | 11/2005 | Koaizawa | C03B 37/0146 65/397 |
| 2005/0272588 | A1* | 12/2005 | Sato | C03B 19/09 501/54 |
| 2006/0081004 | A1* | 4/2006 | Ishikawa | C03B 19/01 65/17.4 |
| 2008/0282734 | A1* | 11/2008 | Kolberg | C03B 5/021 65/32.2 |
| 2009/0038345 | A1* | 2/2009 | Otosaka | C03B 37/029 65/424 |
| 2013/0045854 | A1* | 2/2013 | Coapes | C03B 19/1415 501/53 |
| 2014/0345332 | A1* | 11/2014 | Otosaka | C03B 37/0146 65/427 |

* cited by examiner

SINTERING APPARATUS AND METHOD FOR SINTERING

The contents of the following Japanese patent applications are incorporated herein by reference:
NO. 2015-060873 filed on Mar. 24, 2015; and
NO. 2016-057846 filed on Mar. 23, 2016.

BACKGROUND

1. Technical Field

The present invention relates to a sintering apparatus and a method for sintering for a porous glass base material.

2. Related Art

VAD, OVD and the like are known as a manufacturing method for an optical fiber glass base material. With these methods, at first, glass microparticles are generated by hydrolysis burning a glass raw material in a flame. Next, a porous glass base material is formed by attaching the generated glass microparticles to a rotating target rod. Further, the porous glass base material is sintered at 1400° C. to 1600° C., and a transparent optical fiber glass base material is obtained.

The porous glass base material is sintered at an atmosphere with a specific composition. During sintering in a sintering apparatus, if an outside air enters into a furnace core tube where the porous glass base material is housed, the quality of the manufactured transparent glass base material would be lowered. Also, if the atmosphere inside of the furnace core tube leaks to the outside, the environment would be contaminated. Here, there have been various structures proposed to close the furnace core tube in the sintering apparatus (for example, refer to Patent Document 1).

PRIOR ART DOCUMENT

Patent Document

[Patent Document 1] Japanese Patent Application Publication No. 2002-226218

SUMMARY

A structure to close a furnace core tube during sintering is difficult to be assembled due to its complicate nature and is not easy for operation, either. Further, the air-tightness is degraded due to the component deterioration along with the increase of the operating time of the sintering apparatus. Here, a simple and long-life structure has been searched to prevent the outside air from entering into the furnace core tube during sintering and to prevent the gas inside of the tube from leaking.

According to a first aspect of the present invention, provided is a sintering apparatus for sintering a porous glass base material, comprising a furnace core tube which is surrounded by heaters and houses the porous glass base material, a lid member which is mounted at one end of the furnace core tube with an insertion hole through which a holding rod coupled with the porous glass base material is inserted, a sealing chamber which is provided at the lid member covering the insertion hole with a supply port that introduces seal gas and a discharging port that discharges the seal gas, and a cylindrical member which causes a pressure difference of atmospheres between the gas inside of the tube within the furnace core tube and the gas inside of the sealing chamber to be generated while the holding rod is inserted through the cylindrical member inside of the sealing chamber.

According to a second aspect of the present invention, provided is a sintering method for housing and sintering a porous glass base material in a furnace core tube, comprising heating the porous glass base material housed in the furnace core by heaters that surround the furnace core tube while maintaining a pressure of gas inside of the tube within the furnace core tube higher than the atmospheric pressure, discharging a part of the gas inside of the tube, through a space between a holding rod coupled with the porous glass base material and a lid member mounted at one end of the furnace core tube with an insertion hole through which the holding rod is inserted and through a space between the holding rod and a cylindrical member through which the holding rod is inserted, into a sealing chamber that is provided at the lid member covering the insertion hole, and discharging a part of the gas inside of the tube discharged into the sealing chamber from a discharging port provided in the sealing chamber into the outside along with seal gas that is supplied from a supply port provided in the sealing chamber.

The above-stated summary of the invention does not describe all features of the present invention. The present invention may also be a sub-combination of the features described above.

DESCRIPTION OF EXEMPLARY EMBODIMENTS

Hereinafter, some embodiments of the present invention will be described. The following embodiments do not limit the invention according to the claims, and all the combinations of the features described in the embodiments are not necessarily essential to means provided by aspects of the invention.

Figure 1:
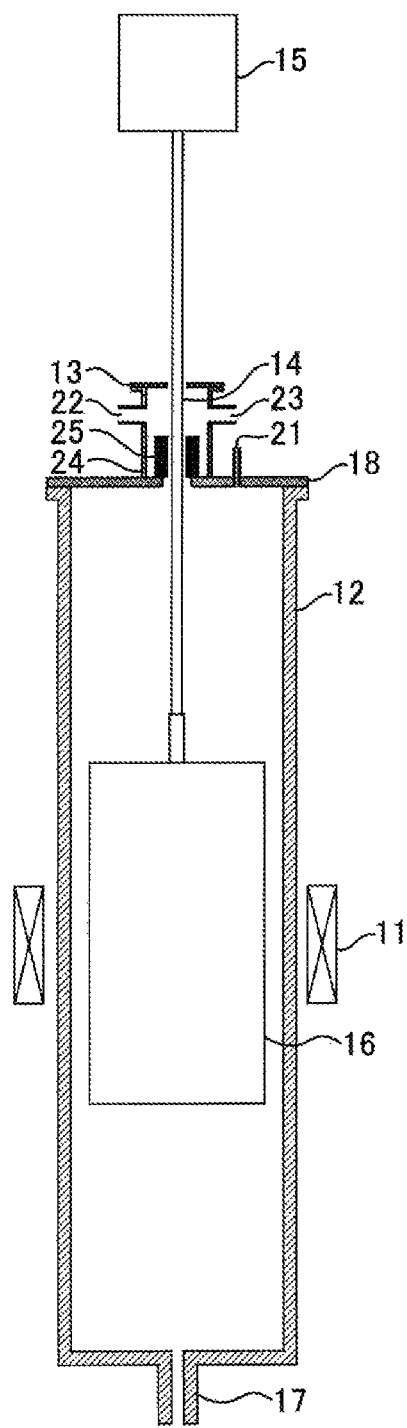
FIG. 1 is a schematic cross sectional view showing a structure of a sintering apparatus 10.

FIG. 1 is a schematic cross sectional view showing a structure of the sintering apparatus 10. The sintering apparatus 10 comprises heaters 11, the furnace core tube 12, and a rotation chuck 15. Also, a lid member 18, the cylindrical chamber 24, the cylindrical member 25, and an upper lid member 13 are disposed at the upper end of the furnace core tube 12 in the drawing.

The furnace core tube 12 has a vertically long cylindrical shape with an inner diameter and a length that can house a porous glass base material 16. The heaters 11 are disposed surrounding the furnace core tube 12 laterally. A gas introducing port 17 is provided at a bottom of the furnace core tube 12 to supply, into the furnace core tube 12, gas inside of the tube which is to be an atmosphere when sintering the porous glass base material 16. When sintering the porous glass base material 16 in the sintering apparatus 10, the gas inside of the tube with He and the like as bases fills inside of the furnace core tube 12.

The rotation chuck 15 is disposed above the furnace core tube 12 in the drawing and grips an upper portion of the holding rod 14 coupled with the porous glass base material 16 housed in the furnace core tube 12. Also, the rotation chuck 15 raises and lowers the gripped holding rod 14, and rotates the porous glass base material 16 about the holding rod 14. Thereby, the entire porous glass base material 16 can be heated efficiently and uniformly.

A sealing structure that closes the furnace core tube 12 being housing the porous glass base material 16 is formed at an upper end of the furnace core tube 12. In the illustrated sintering apparatus 10, the lid member 18 is placed at the upper end of the furnace core tube 12. An insertion hole through which the holding rod 14 is inserted is arranged at an approximate center of the lid member 18. Also, a gas discharging port 21 for connecting the inside and outside of the furnace core tube 12 is disposed at the lid member 18.

The cylindrical member 25 and the cylindrical chamber 24 forming the sealing structure are disposed on the upper surface of the lid member 18 in the drawing. The holding rod 14 is inserted through an approximate center of the cylindrical member 25.

The cylindrical chamber 24 is disposed at the upper surface of the lid member 18 in the drawing, covering the cylindrical member 25. Furthermore, the upper end of the cylindrical chamber 24 is closed in the upper lid member 13. The holding rod 14 is also inserted through the upper lid member 13. The cylindrical chamber 24 and the upper lid member 13 form a sealing chamber at the upper portion of the furnace core tube 12.

Figure 2:
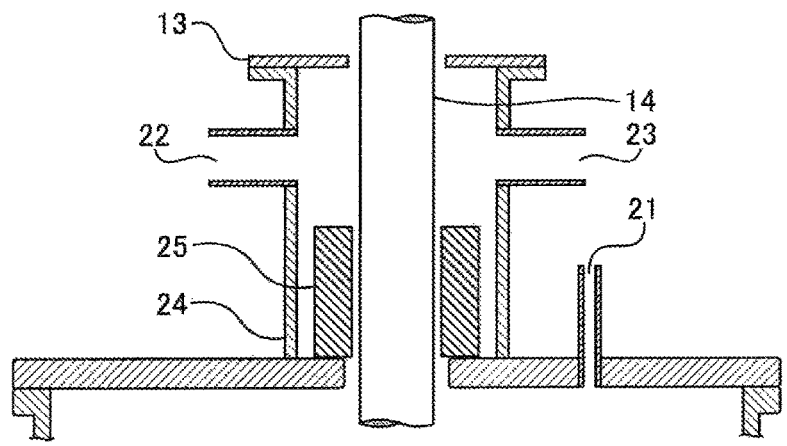
FIG. 2 is a diagram to show a sealing structure in the sintering apparatus 10.

FIG. 2 shows an enlarged view of the sealing structure formed at the upper portion of the furnace core tube 12 in the sintering apparatus 10. Components that are the same as those shown in FIG. 1 are given the same reference numerals, and redundant descriptions are omitted.

The gas discharging port 21 provided at the lid member 18 connects the inside of the furnace core tube 12 with the outside, and directly discharges the gas inside of the tube from the inside of the furnace core tube 12 to the outside. Thereby, for example, when the gas pressure inside the tube within the furnace core tube 12 increases sharply, the impact on the furnace core tube 12 can be mitigated. The gad inside of the tube discharged from the gas discharging port 21 is guided to an exhaust means and an exhaust treatment apparatus which are not shown in the drawings.

The cylindrical chamber 24 has at side surfaces a supply port 22 that supplies seal gas and an exhaust port 23 that discharges the supplied seal gas respectively. The seal gas may be, for example, an atmospheric air. The gas exhausted from the exhaust port 23 includes the seal gas as well as the gas inside of the tube leaking from the furnace core tube 12 to the cylindrical chamber 24. Therefore, the seal gas discharged from the exhaust port 23 is guided to the exhausting means and the exhaust treatment apparatus which are not shown in the drawings.

The cylindrical member 25 has a vertically long and cylindrical shape. The cylindrical chamber 24 has an inner diameter and a height which are greater than an outer diameter and a height of the cylindrical member 25. Accordingly, in the cylindrical chamber 24, the cylindrical member 25 moves smoothly along the holding rod 14 in the inside of the cylindrical chamber 24.

In the sintering apparatus 10 having such a sealing structure as described above, when sintering the porous glass base material 16, the pressure inside the furnace core tube 12 is maintained higher than the atmospheric pressure. Thereby, in the sintering apparatus 10, through a space between an insertion hole 19 of the lid member 18 and the holding rod 14, and a space between an inner surface of an through hole 26 of the cylindrical member 25 and the holding rod 14, the porous glass base material 16 is sintered while a part of the gas inside of the tube within the furnace core tube 12 flows from the furnace core tube 12 into the cylindrical chamber 24.

In the sintering apparatus 10, in a state where the holding rod 14 is inserted through the cylindrical member 25, a pressure difference $\Delta p$ between the pressure on the cylindrical member 25 near the furnace core tube 12 side and the pressure on the cylindrical member 25 near the cylindrical chamber 24 side is represented by the following Expression 1, where a length of the cylindrical chamber 24 is L.

$$\Delta p = \lambda \cdot \frac{L}{S} \cdot \frac{u^2 \cdot p}{2} \qquad \text{Expression 1}$$

Note that each symbol in the above-described Expression 1 represents the following values respectively.

$\lambda$: tube friction coefficient;
$\rho$: density of gas inside of the tube;
u: flow velocity of gas flowing in a gap between the cylindrical member and the holding rod; and
S: hydrodynamic corresponding area.

Here, the hydrodynamic corresponding area S is represented by the following Expression 2, where a flow path area is A and a wetted perimeter length is s. It should be noted that the wetted perimeter length s is, in a flow cross section, a sum of a length of an outer wall surface of the holding rod and a length of an inner wall surface of the cylindrical chamber in contact with the flow.

$$S = 4 \cdot \frac{A}{s} \qquad \text{Expression 2}$$

Also, the flow path area A, and the wetted perimeter length s are represented respectively by the following Expression 3 and Expression 4, where a diameter of the holding rod 14 is D and a hole diameter of the cylindrical member is d.

$$A = \left(\frac{D}{2}\right)^2 + \left(\frac{d}{2}\right)^2 \qquad \text{Expression 3}$$

$$s = \pi \cdot (D + d) \qquad \text{Expression 4}$$

Furthermore, a flow velocity u of the gas flowing through the gap between the cylindrical member 25 and the holding rod 14 is represented by the following Expression 5, where a flow rate of the gas flowing through the gap is q.

$$u = \frac{q}{A} \qquad \text{Expression 5}$$

Accordingly, by using the above-described Expression 1 to Expression 5 determining the pressure difference between the atmospheric pressure and the inner pressure of the furnace core tube 12, the length of the cylindrical member 25 and the diameter of the through hole 26, the gas inside the furnace core tube 12 can be controlled to flow at a predetermined flow rate from the furnace core tube 12 toward the cylindrical chamber 24. In this case, the value of the diameter D of the holding rod is determined according to the design of the apparatus such as the mechanical strength and the like.

For example, when D=40 mm, if the gas flow rate flowing in the gap is to be set as 0.1 L/min and the pressure difference is to be set as 500 Pa, the hole diameter d of the cylindrical member is 40.17 mm (d=40.17 mm). It is preferable to have a small hole diameter of the cylindrical member and a narrow gap between the holding rod and the cylindrical member so that a large pressure difference is obtained. However, in consideration of the manufacturing precision of the outer diameter of the holding rod and the manufacturing precision of the hole of the cylindrical member, it is preferable to set a lower limit of the difference between the hole diameter d of the cylindrical member and the diameter D of the holding rod to about 0.1 mm (d-D=0.1 mm).

In this embodiment, when the outer diameter of the holding rod 14 was 40 mm, in the cylindrical member 25, a clearance between an inner surface of the insertion hold 19 through which the holding rod 14 was inserted and the holding rod 14 was set to a range no less than 0.1 mm and no greater than 0.15 mm. If the clearance is less than 0.1 mm, the possibility that the cylindrical member 25 and the holding rod 4 is in contact with each other becomes high and there is a concern that a smooth raising and lowering of the holding rod 14 may be hindered.

On the other hand, if the above-described clearance is over 0.15 mm, the seal gas within the cylindrical chamber 24 easily enters the furnace core tube 12 from the space between the cylindrical member 25 and the holding rod 14. From a similar point of view, the entry of the seal gas into the furnace core tube 12 can be effectively prevented by setting the length of the cylindrical member 25 to be no less than 100 mm.

It should be noted that, in terms of a smooth relative movement between the holding rod 14 and the cylindrical member 25, it is preferable to set the vertical degree of the inner surface of the through hole 26 in the cylindrical member 25 to the surface in contact with the upper surface of the lid member 18 to be no greater than 0.01 mm.

On the other hand, from the perspective of shutoff of the gas flow between the cylindrical chamber 24 and the furnace core tube 12, it is desirable that the upper surface of the lid member 18 adheres to a bottom surface of the cylindrical member 25. From such a point of view, a surface roughness of the surface where the lid member 18 and the cylindrical member 25 are in contact with each other is preferably no greater than Ra 2.0.

Also, from the perspective of a smooth displacement of the cylindrical member 25 relative to the holding rod 14, the cylindrical member 25 is preferably to be lubricative with respect to the holding rod 14 at least at the inner surface of the through hole 26. Also, the temperature of the holding rod 14 becomes high particularly when the holding rod 14 is raised from the furnace core tube 12. Accordingly, the cylindrical member 25 is preferably to be heat resistant to the temperature of the holding rod 14. As a material having such characteristics, for example, a carbon bulk material can be exemplified.

In the above-described example, the cylindrical chamber 24 and the cylindrical member 25 are used as the sealing chamber and as the sealing member respectively. Of course, shapes of the sealing chamber and the sealing member are not limited to be cylindrical shapes.

EXPERIMENT EXAMPLE

The cylindrical member 25 with a hole diameter of 40.14 mm and a length of 150 mm was made and was arranged within a cylindrical chamber provided on an upper lid of a furnace core tube. Note that the outer diameter of the holding rod was set to 40 mm (a design value). The gas flow rate flowing in a gap between the holding rod 14 and the through hole 26 of the cylindrical member 25 was measured while changing the inner pressure of the furnace core tube 12.

Figure 3:
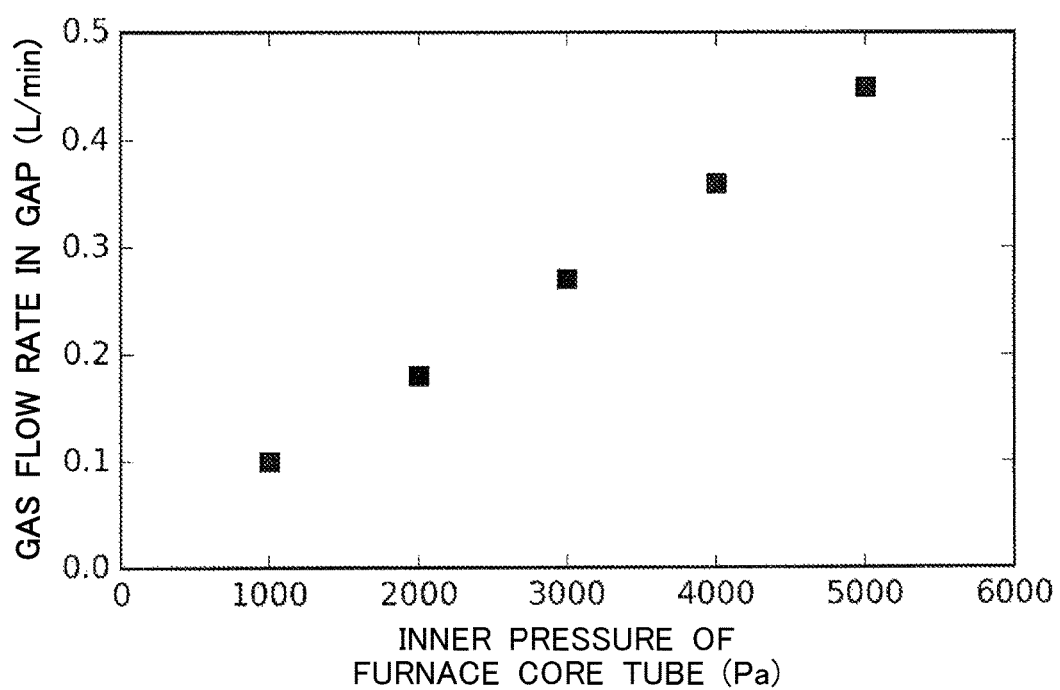
FIG. 3 is a graph to show the relation between inner pressures of a furnace core tube 12 and flow rates of gas flowing toward a cylindrical chamber 24.

FIG. 3 is a graph showing a result of measurement for the above measurement. As shown in the drawing, it is found that there is a high correlation between the inner pressure of the furnace core tube 12 and the gas flow rate and the pressure inside of the furnace core tube 12 can be managed by controlling the gas flow rate. Accordingly, the flow rate of the gas inside of the tube flowing from the furnace core tube 12 toward the cylindrical chamber 24 is preferably to be controlled so as to be a predetermined flow rate.

It should be noted that as the inner pressure of the furnace core tube is set to a gauge pressure of about 1000 Pa to 2000 Pa, it is found that the gas flow rate flowing in the gap can also be reduced and a long-term use can be endured. As a result of sintering the porous glass base material while maintaining the inner pressure of the furnace core tube of 1000 Pa, it is found that there is no problem on the optical characteristics of the obtained glass base material.

In this way, with the sintering apparatus 10, the gap (clearance) between the hole of the cylindrical member provided within the cylindrical chamber on the upper lid and the holding rod is set to 0.1 mm to 0.15 mm, the length of the cylindrical member is set to be no less than 100 mm, the gas flows from the inside of the furnace core tube toward the cylindrical chamber, and sintering is performed while exhausting the gas from the exhaust port of the cylindrical chamber; thereby, it can prevent the outside air from entering into the furnace core tube from the gap, and the sintering can be performed without negative effects on the characteristics of the glass base material.

Figure 4:
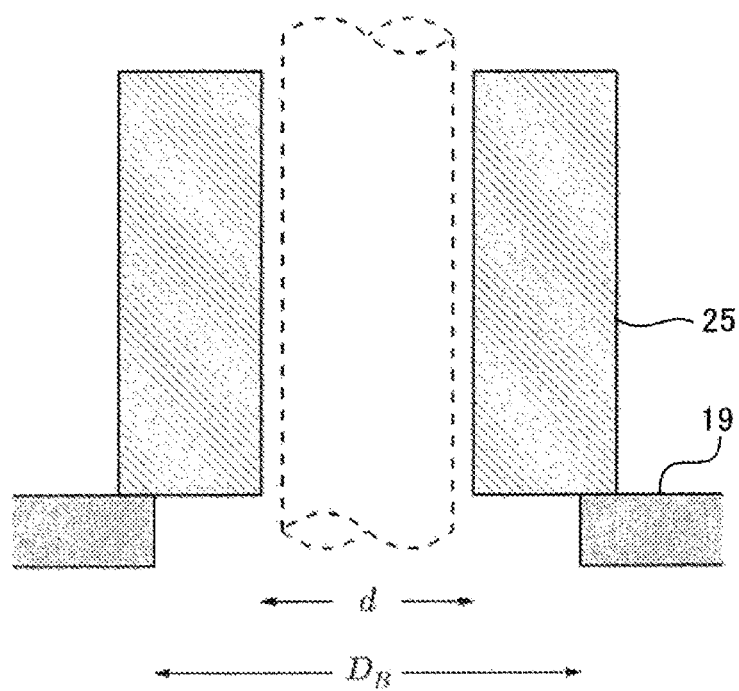
FIG. 4 is a schematic diagram to show a specification of a cylindrical member 25.

The following Expression 6 shows a condition where the cylindrical member 25 floats in the sintering apparatus 10 by the pressure of the gas inside of the tube within the furnace core tube 12. FIG. 4 is a diagram to show values used in the Expression 6.

$$P_C = \frac{4\pi g W}{D_B^2 - d^2} \qquad \text{Expression 6}$$

Note that $P_C$ is the pressure of the gas inside of the tube to cause the cylindrical member 25 to float;

$D_B$ is the inner diameter of the insertion hole 19;

d is the inner diameter of the through hole 26;

W is the mass of the cylindrical member 25; and g is the gravitational acceleration.

As described above, upon the pressure of the gas inside of the tube of the furnace core tube 12 reaching the pressure $P_C$, the cylindrical member 25 floats. Thereby, a large amount of the gas inside of the tube of the furnace core tube 12 flows from the furnace core tube 12 into the cylindrical chamber 24 through a wide gap between the upper surface of the lid member 18 and the bottom surface of the cylindrical member 25. Thereby, the gas pressure inside of the tube of the furnace core tube 12 is reduced sharply. Accordingly, by setting the mass of the cylindrical member 25 and the like according to the pressure resistance of the furnace core tube 12 to restrict the upper limit of the inner pressure of the furnace core tube 12, a failure of the furnace core tube 12 caused by the increase of the inner pressure can be prevented.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A sintering apparatus for sintering a porous glass base material, comprising:
    a furnace core tube that is surrounded by heaters, the furnace core tube housing the porous glass base material;
    a lid member that has an insertion hole through which a holding rod coupled with the porous glass base material is inserted, the lid member mounted at one end of the furnace core tube;
    a sealing chamber that has a supply port that introduces seal gas and a discharging port that discharges the seal gas, the sealing chamber provided at the lid member covering the insertion hole; and
    a cylindrical member that causes a pressure difference between gas inside of the furnace core tube and gas inside of the sealing chamber to be generated while the holding rod is inserted through the cylindrical member inside of the sealing chamber, while allowing the gas inside of the furnace core tube to discharge into the sealing chamber.

2. The sintering apparatus according to claim 1, further comprising:
    a direct exhaust port provided at the lid member, wherein gas discharged from the inside of the furnace core tube passes through the direct exhaust port.

3. The sintering apparatus according to claim 1, wherein when the pressure difference becomes greater than a predetermined threshold, the cylindrical member is separated from the lid member to reduce the pressure difference.

4. The sintering apparatus according to claim 1, wherein
    a clearance between the cylindrical member and the holding rod is no less than 0.1 mm and no greater than 0.15 mm, and
    a length of the cylindrical member is no less than 100 mm.

5. The sintering apparatus according to claim 1, wherein, in the cylindrical member,
    a surface roughness of a contact face in contact with the lid member is no greater than Ra 2.0.

6. The sintering apparatus according to claim 5, wherein, in the cylindrical member,
    a vertical degree of an inner surface of a through hole through which the holding rod is inserted, to the contact face, is no greater than 0.01 mm.

7. The sintering apparatus according to claim 1, wherein, in the lid member,
    a surface roughness of a surface in contact with the cylindrical member is no greater than Ra 2.0.

8. A porous glass base material sintering method for housing and sintering the porous glass base material in a furnace core tube, comprising:
    heating the porous glass base material housed in the furnace core tube by heaters which surround the furnace core tube while maintaining a pressure of gas inside the furnace core tube higher than an atmospheric pressure;
    discharging, into a sealing chamber provided at a lid member covering an insertion hole, a part of the gas inside of the furnace core tube, through a space between a holding rod coupled with the porous glass base material and the lid member mounted at one end of the furnace core tube with the insertion hole through which the holding rod is inserted, and through a space between the holding rod and a cylindrical member through which the hold rod is inserted;
    discharging a part of the gas inside of the furnace core tube discharged to the sealing chamber from a discharging port provided at the sealing chamber to outside along with seal gas supplied from a supply port provided at the sealing chamber.

9. The porous glass base material sintering method according to claim 8, comprising:
    controlling a flow rate of gas flowing from the furnace core tube toward the sealing chamber so as to be a predetermined flow rate.

* * * * *